(12) United States Patent
Reis et al.

(10) Patent No.: US 9,922,342 B2
(45) Date of Patent: Mar. 20, 2018

(54) EVALUATING USER ACTIVITY IN SOCIAL ENVIRONMENTS

(75) Inventors: Davi Reis, Belo Horizonte (BR); Christian Oestlien, New York, NY (US); Eider Silva de Oliveira, Belo Horizonte (BR); Marcus A. Leal, Belo Horizonte (BR); Igor P. Soares, Belo Horizonte (BR)

(73) Assignee: Google LLC, Mountain View, CA (US)

( * ) Notice: Subject to any disclaimer, the term of this patent is extended or adjusted under 35 U.S.C. 154(b) by 869 days.

(21) Appl. No.: 13/339,131

(22) Filed: Dec. 28, 2011

(65) Prior Publication Data
US 2012/0166290 A1 Jun. 28, 2012

Related U.S. Application Data
(60) Provisional application No. 61/427,527, filed on Dec. 28, 2010.

(51) Int. Cl.
*G06Q 30/00* (2012.01)
*G06Q 30/02* (2012.01)

(52) U.S. Cl.
CPC ..... *G06Q 30/0251* (2013.01); *G06Q 30/0269* (2013.01)

(58) Field of Classification Search
CPC ............... G06Q 50/01; G06Q 30/0241; G06Q 30/0251; G06Q 30/0255; G06Q 30/0269; G06Q 30/0277
See application file for complete search history.

(56) References Cited

U.S. PATENT DOCUMENTS 6,636,247 B1 * 10/2003 Hamzy ................. G06Q 30/02
  705/14.73
8,135,800 B1 * 3/2012 Walsh et al. .................. 709/217
(Continued)

FOREIGN PATENT DOCUMENTS

KR  10-2009-0083473  8/2009
KR  10-2010-0090508  8/2010

OTHER PUBLICATIONS

Authorized officer Mi Jeong Park, International Search Report and Written Opinion in PCT/US2011/067641, dated Aug. 28, 2012, 9 pages.

*Primary Examiner* — Bennett M Sigmond
(74) *Attorney, Agent, or Firm* — Fish & Richardson P.C.

(57) ABSTRACT

Methods, systems, and apparatus, including computer programs encoded on a computer-readable storage medium, are described for providing content. A method includes: receiving a request for an advertisement to be displayed in a slot associated with a third-party content site; identifying a relevant advertisement to be provided in the slot; determining information to be included in an annotation associated with the advertisement, the annotation including customized information related to a user or a group associated with the user that is to be presented along with the advertisement; providing the advertisement responsive to the request including providing the annotation along with a control for re-publishing the advertisement along with the relevant advertisement; receiving user input selecting the control and designating the advertisement for re-publishing; and targeting additional content to the user or a group associated with the user based on the received user input.

25 Claims, 7 Drawing Sheets

(56) References Cited

U.S. PATENT DOCUMENTS

| | | | |
|---|---|---|---|
| 8,660,900 B2* | 2/2014 | Stein | G06Q 30/02 705/14.73 |
| 8,812,561 B2* | 8/2014 | Guido | G06F 17/241 707/769 |
| 2003/0177064 A1* | 9/2003 | Emura | G06Q 30/0273 705/14.69 |
| 2004/0162760 A1 | 8/2004 | Seet et al. | |
| 2005/0086109 A1* | 4/2005 | McFadden et al. | 705/14 |
| 2005/0278443 A1* | 12/2005 | Winner et al. | 709/224 |
| 2008/0040028 A1* | 2/2008 | Crump | G06F 17/30241 701/532 |
| 2008/0071616 A1* | 3/2008 | Hovnanian et al. | 705/14 |
| 2008/0189169 A1* | 8/2008 | Turpin et al. | 705/10 |
| 2008/0256233 A1* | 10/2008 | Hall et al. | 709/224 |
| 2008/0276269 A1* | 11/2008 | Miller | G06Q 30/02 725/34 |
| 2008/0281685 A1* | 11/2008 | Jaffe | G06Q 30/02 705/14.41 |
| 2009/0018918 A1* | 1/2009 | Moneypenny et al. | 705/14 |
| 2009/0048922 A1* | 2/2009 | Morgenstern et al. | 705/14 |
| 2009/0157511 A1* | 6/2009 | Spinnell | G06Q 30/02 705/14.1 |
| 2009/0216620 A1* | 8/2009 | Lee | 705/10 |
| 2009/0248516 A1* | 10/2009 | Gross | 705/14 |
| 2009/0292608 A1* | 11/2009 | Polachek | 705/14.44 |
| 2009/0319178 A1 | 12/2009 | Khosravy et al. | |
| 2009/0319359 A1* | 12/2009 | Soza et al. | 705/14.25 |
| 2010/0010866 A1* | 1/2010 | Bal et al. | 705/10 |
| 2010/0042471 A1* | 2/2010 | Chang et al. | 705/10 |
| 2010/0057563 A1 | 3/2010 | Rauber et al. | |
| 2010/0057569 A1* | 3/2010 | Cantelmo | G06Q 30/0257 705/14.55 |
| 2010/0145777 A1* | 6/2010 | Ghosh et al. | 705/14.1 |
| 2010/0228582 A1* | 9/2010 | King et al. | 705/7 |
| 2010/0257023 A1* | 10/2010 | Kendall | G06Q 30/02 705/14.46 |
| 2010/0318611 A1* | 12/2010 | Curtin | G06F 17/30 709/206 |
| 2011/0119128 A1* | 5/2011 | Fang | G06Q 30/02 705/14.49 |
| 2011/0145068 A1* | 6/2011 | King | G06F 17/211 705/14.55 |
| 2011/0153421 A1* | 6/2011 | Novikov et al. | 705/14.52 |
| 2011/0196724 A1* | 8/2011 | Fenton | G06Q 20/108 705/14.16 |
| 2011/0320250 A1* | 12/2011 | Gemmell et al. | 705/14.16 |

* cited by examiner

EVALUATING USER ACTIVITY IN SOCIAL ENVIRONMENTS

CROSS-REFERENCE TO RELATED APPLICATION

This application claims priority to U.S. Provisional Application No. 61/427,527, filed on Dec. 28, 2010. The disclosure of the prior application is considered part of and is incorporated by reference in the disclosure of this application.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for advertisements to be provided with the resources. For example, a web page can include advertisement slots in which advertisements can be presented. These advertisements slots can be defined in the web page or defined for presentation with a web page, for example, in a pop-up window.

Advertisement slots can be allocated to advertisers through an auction. For example, advertisers can provide bids specifying amounts that the advertisers are respectively willing to pay for presentation of their advertisements ("ads"). In turn, an auction can be performed and the advertisement slots can be allocated to advertisers according, among other things, to their bids and/or the relevance of the advertisement to content presented on a page hosting the slot or a request that is received for the advertisement.

SUMMARY

In general, one innovative aspect of the subject matter described in this specification can be implemented in methods that include a method for providing content. The method comprises: receiving a request for an advertisement to be displayed in a slot associated with a third-party content site; identifying a relevant advertisement to be provided in the slot; determining information to be included in an annotation associated with the advertisement, the annotation including customized information related to a user or a group associated with the user that is to be presented along with the advertisement; providing the advertisement responsive to the request including providing the annotation along with a control for re-publishing the advertisement along with the relevant advertisement; receiving user input selecting the control and designating the advertisement for re-publishing; and targeting additional content to the user or a group associated with the user based on the received user input.

These and other implementations can each optionally include none, one or more of the following features. The method can further comprise tracking inputs received from the user for advertisements that are designated for re-publishing where targeting includes targeting the user based on the tracked inputs. Receiving user input can include receiving user input as recipients for receiving the re-published advertisement. The method can further comprise tracking designations to whom a user re-publishes advertisements to and targeting additional content to the user or group associated with the user based on the tracking. The method can further comprise tracking designations for how often a user re-publishes advertisements and targeting additional content to the user or group associated with the user based on the tracking. The user input can include a designation to provide the advertisement to a social application for presentation in an activity stream associated with the user. The method can further comprise tracking user interactions with the advertisement when presented in the activity stream and targeting additional content to the user or group associated with the user based on the tracking. The method can further comprise tracking where a user is located or a time of designation for designations to re-publish an advertisement and targeting additional content to the user or group associated with the user based on the tracking. The method can further comprise tracking a context associated with a user when making a designation to re-publish an advertisement and targeting additional content to the user or group associated with the user based on the tracking. The user input can include a designation to provide the advertisement to a social application for presentation as an update for the user in an activity stream associated with one or more members of a group specified by the user. The method can further comprise tracking interactions with the advertisement when presented in the activity stream and targeting additional content to the user or others based on the tracking. The method can further comprise tracking whom a user designates advertisements to be re-published to so as to infer relationships between the user and the designatees and targeting additional content to the user or group associated with the user based on the tracking. The user's group can be a social circle. The control can enable a user to re-publish the advertisement to one or more members of a user's group. The group can be a social circle, family, friends, work groups, or some other particularly identified group. The control can enable the user to re-publish the advertisement to others that are not members of a user's group. The control can enable a user to re-publish the advertisement along with a message. The targeting can include using the user input as a signal when determining relevant content to be provided to the user in the future. The method can further comprise determining one or more social signals for use in affecting a quality score that is used to evaluate content to be provided to the user where the one or more social signals are based at least in part on the user input. The method can further comprise determining one or more social signals based at least in part on the user input and using the social signals when determining content for presentation to the user. The one or more social signals can be used to categorize the user as belonging to a group. The one or more social signals can be used to customize annotations to be included with the advertisement that is re-published by the user. The one or more social signals can be used to determine whether a system that re-publishes advertisements should re-publish other advertisements to the user. The one or more social signals can be used to surface the user to an advertiser. The method can further comprise targeting additional content to a recipient of a re-published advertisement based on the tracking.

In general, another innovative aspect of the subject matter described in this specification can be implemented in computer program products that include a computer program product tangibly embodied in a computer-readable storage device. The computer program product includes instructions that, when executed by a processor, cause the processor to: receive a request for an advertisement to be displayed in a slot associated with a third-party content site; identify a relevant advertisement to be provided in the slot; determine information to be included in an annotation associated with the advertisement, the annotation including customized information related to a user or a group associated with the user that is to be presented along with the advertisement; provide the advertisement responsive to the request including providing the annotation along with a control for re-publishing the advertisement along with the relevant advertisement; receive user input selecting the control and designating the advertisement for re-publishing; and target additional content to the user or a group associated with the user based on the received user input.

In general, another innovative aspect of the subject matter described in this specification can be implemented in systems. A system includes a user device of a user, a third party content site, and a content management system. The content management system is configured to: identify a relevant advertisement to be provided in a slot associated with the third party content site, based on receiving a request from the user device for an advertisement to be displayed in the slot; determine information to be included in an annotation associated with the advertisement, the annotation including customized information to be presented along with the advertisement; provide, to the user device, the advertisement responsive to the request including providing the annotation along with a control for re-publishing the advertisement along with the relevant advertisement; and target additional content to the user based on the received user input.

Particular implementations may realize none, one or more of the following advantages. For example, targeting content to a user based on a user designating an advertisement for republishing can result in the user receiving content in which they have an interest. A user who may be interested in an advertiser's product or services can be surfaced to an advertiser.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
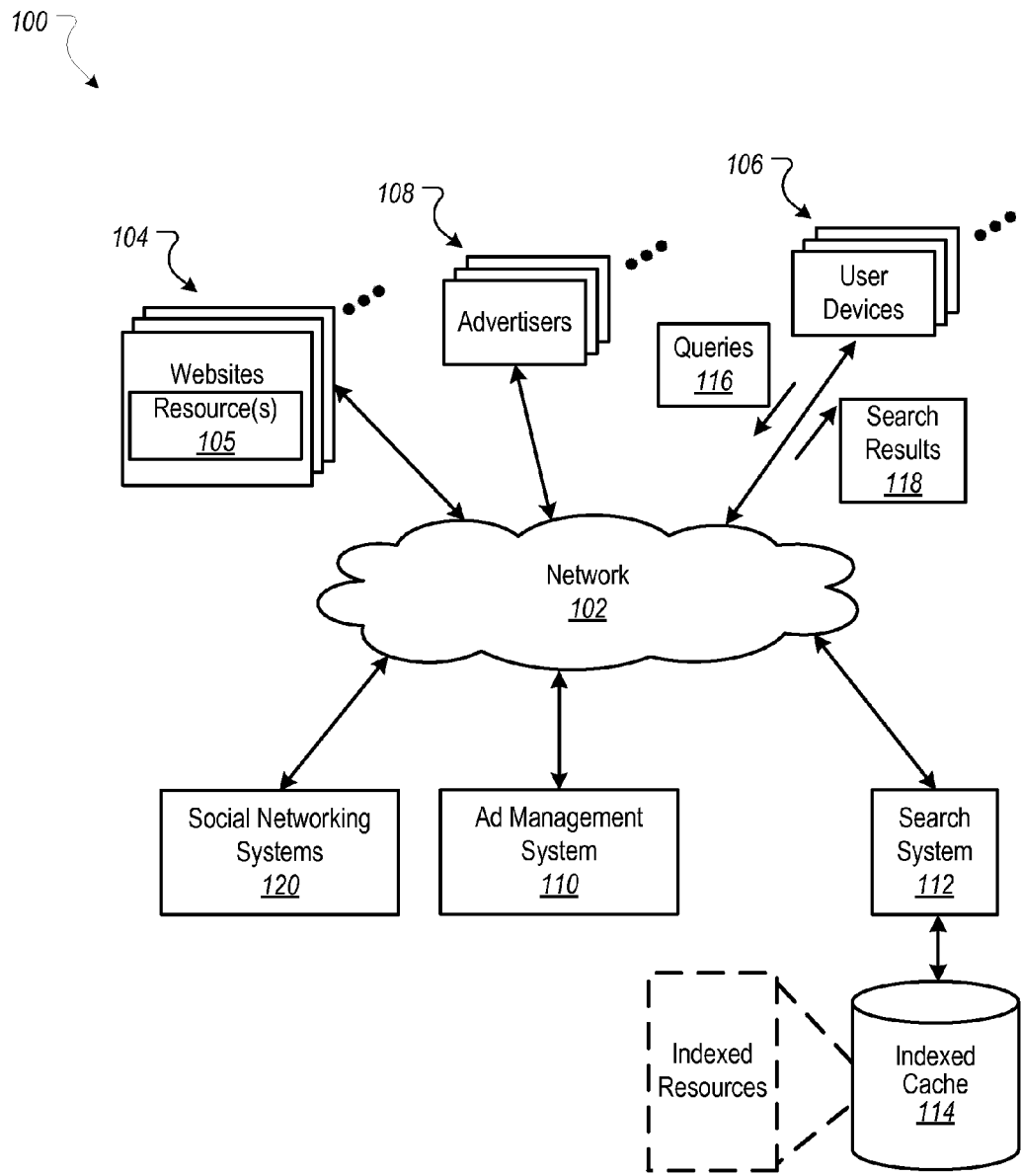
FIG. 1 is a block diagram of an example environment that provides social overlays on ads.

When a user requests on-line content (e.g., a web page or another online resource), content requests can be initiated to request content from a content publisher for presentation on a user device. For example, content publishers can include publishers of web sites or search engines that are publishing search results responsive to a query. One or more additional content items (e.g., ads) can be provided along with the requested content. As a result, the presented content can be, for example, text, images, audio, video, advertisements (or ads) or other content selected for presentation to the user. In response to each content request received, content can be served, including one or more ads. In some implementations, some ads can include a social component or context.

For example, an ad that is served can include a social overlay that includes social information and tools for propagating social information to others. As a result, users can re-publish ads to others, including friends and family. For example, an ad with associated comments can be presented as an update to a social application activity stream of the user, to activity streams of friends and family, and/or activity streams of one or more groups associated with the user. By re-publishing an ad, a user can make his preferences known, including providing comments for specific ads, and the comments can be handled in a structured way. By providing the ability for users to annotate and comment upon ads within a social context, ads can be more interesting to users and their social contacts. As a result, more user attention can be captured by the ads, which can result in higher click-through-rates and overall ad effectiveness. Another use and benefit of the social overlays on ads is the ability to capture user feedback. Advertisers can capture information (e.g., ad-sharing statistics, etc.) for ads in order to gauge the quality of their ads, the effectiveness of ad campaigns, and the popularity of certain product brands that are featured in ads.

In some examples, activity streams, as provided by social networking web sites and applications, allow a user to publish user updates and make the updates accessible or viewable by designatees. For example, a user can publish messages, photos, or other content to his activity stream, and share the content with individuals, family, friends, or other groups. Alternatively, the user's publication of content can be to a presence associated with the user in a social environment. In another example, the publication can be to a subscriber to the updates. In some implementations, the publication can be to an area that is designated for providing updated content for the user (e.g., a wall or social profile page). Other mechanisms are possible for providing the publication medium.

In some implementations, a widget (e.g., a graphical user interface control) can be overlaid on an ad creative that is displayed to Internet users, such as on a third-party web site. The widget can show social annotations that provide information about the specific ad that is being displayed. This information can include, for example, the number of users who liked or that have interacted with the ad, the number of users in a certain geographic region who re-published the ad, and the name of a user's friend who liked an ad, and so on. The widget can also include buttons or other controls that allow the user to designate (i.e., the user likes the ad, the user wants to share or re-publish the ad, or the user wants to otherwise positively endorse the ad), and comment on a given ad, and, in some implementations, follow an advertiser (e.g., an advertiser's profile) in a social network. In some implementations, designating an ad is referred to as "plus one'ing" ("+1'ing") an ad.

In response to a designation to re-publish an ad, additional content can be targeted to the user or to a group associated with the user. For example, ads similar to the ad designated for re-publishing can be presented to the user in the future, such as in an ad slot included in a search results web page or some other web page. As other examples, ads can be selected based on other factors, such as a context associated with the re-publishing, or based on other interactions occurring with the re-published ad. Targeting of additional content to the user or a group associated with the user based on a designation to re-publish an ad is described in more detail below with respect to FIG. 8.

FIG. 1 is a block diagram of an example environment 100 that provides social overlays on ads. The example environment 100 includes an ad management system 110 that manages advertising services and one or more social networking systems 120 that allow users to interact with other users within a social framework. The example environment 100 includes a network 102, such as a local area network (LAN), a wide area network (WAN), the Internet, or a combination thereof. The network 102 connects websites 104, user devices 106, advertisers 108, the ad management system 110, and social networking systems 120. The example environment 100 may include many thousands of websites 104, user devices 106, and advertisers 108.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images and sounds, that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which advertisements can be presented. These specified portions of the resource or user display are referred to as advertisement slots.

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements can be presented.

When a resource 105 or search results 118 are requested by a user device 106, the ad management system 110 receives a request for advertisements to be provided with the resource 105 or search results 118. The request for advertisements can include characteristics of the advertisement slots that are defined for the requested resource or search results page, and can be provided to the ad management system 110. For example, a reference (e.g., URL) to the resource for which the advertisement slot is defined, a size of the advertisement slot, and/or media types that are available for presentation in the advertisement slot can be provided to the ad management system 110. Similarly, keywords associated with a requested resource ("resource keywords") or a search query 116 for which search results are requested can also be provided to the ad management system 110 to facilitate identification of advertisements that are relevant to the resource or search query 116.

Based at least in part on data included in the request for advertisements, the ad management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries 116. In some implementations, advertisements having targeting keywords that match the resource keywords or the search query 116 are selected as eligible advertisements by the ad management system 110.

A targeting keyword can match a resource keyword or a search query 116 by having the same textual content ("text") as the resource keyword or search query 116. For example, an advertisement associated with the targeting keyword "beaches" can be an eligible advertisement for an advertisement request including the resource keyword "beaches." Similarly, the advertisement can be selected as an eligible advertisement for an advertisement request including the search query "beaches."

The ad management system 110 can select from the eligible advertisements that are to be provided for presentation in advertisement slots of a resource or search results page based on results of an auction. For example, the ad management system 110 can receive bids from advertisers and allocate the advertisement slots, based at least in part on the received bids (e.g., based on the highest bidders at the conclusion of the auction). The bids are amounts that the advertisers are willing to pay for presentation (or selection) of their advertisement with a resource or search results page. For example, a bid can specify an amount that an advertiser is willing to pay for each 1000 impressions (i.e., presentations) of the advertisement, referred to as a CPM bid. Alternatively, the bid can specify an amount that the advertiser is willing to pay for a selection (i.e., a click-through) of the advertisement or a "conversion" following selection of the advertisement. The selected advertisements can be determined based on the bids alone, or based on the bids of each bidder being multiplied by one or more factors, such as quality scores derived from advertisement performance, landing page scores, and or other factors. In some implementations, the bids can be based on whether the ad includes social information, such as information that identifies how the user or other users in the user's social network have responded to the ad. For example, the social information can be used to generate a social overlay on the ad.

A conversion occurs when a user performs a particular action related to an advertisement provided with a resource or search results page. What constitutes a conversion may vary from case-to-case and can be determined in a variety of ways. For example, a conversion may occur when a user clicks on an advertisement, is referred to a web page, and consummates a purchase there before leaving that web page. A conversion can also be defined by an advertiser to be any measurable/observable user action, such as downloading a white paper, navigating to at least a given depth of a website, viewing at least a certain number of web pages, spending at least a predetermined amount of time on a website or web page, registering on a website, sharing an ad with other users within a social network, or commenting upon an ad where the comments are visible to others. Other actions that constitute a conversion can also be used.

The system 100 includes one or more social networking systems 120 that provide functions and tools for users to share information in a social network. For example, a social networking system 120 can be a social networking website that users can use to identify friends and social groups (e.g., circles), send and receive email, post messages and multimedia (e.g. photos, video, audio), track social events, provide updates and so on.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of a user cannot be determined.

Example user interfaces for displaying social overlays are described below with reference to FIGS. 2-7. Various user interface elements for receiving user data input are described below with reference to FIGS. 2-7. Example user interface elements include text boxes, radio buttons, check boxes, drop-down menus, and hypertext links.

Figure 2:
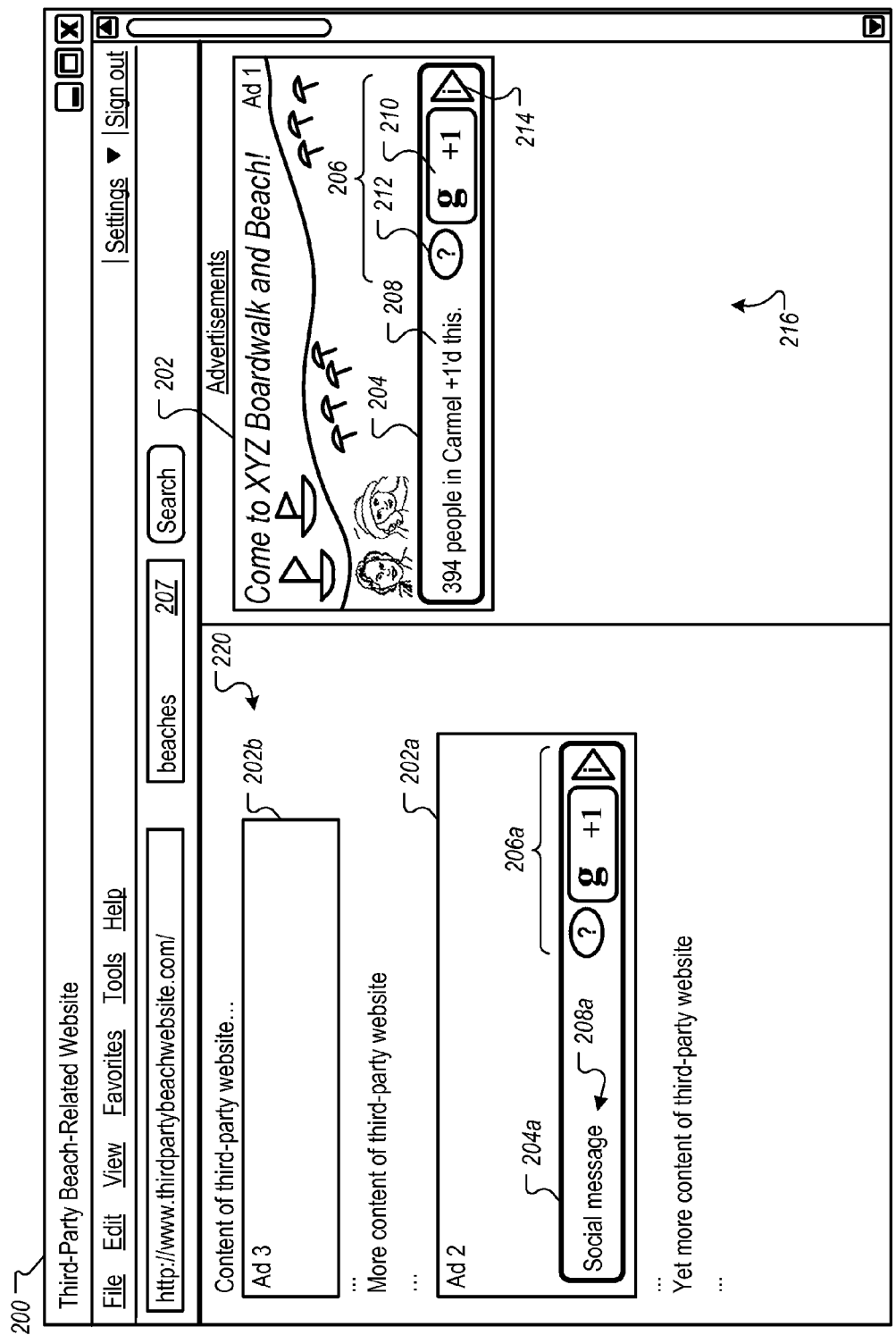
FIG. 2 shows an example user interface that includes an ad with a social overlay and a control for re-publishing the ad.

FIG. 2 shows an example user interface 200 that includes an ad 202 with a social overlay 204 and a control 206 for re-publishing the advertisement. For example, a user can use the control 206 to re-publish the ad to one or more members of the user's groups. The user interface 200 can be provided, for example, by the ad management system 110 of FIG. 1. For example, the ad 202 can be an ad that is served with other content, such as included with search results 118 that are responsive to a user's query 116, as described above. In another example, the ad 202 can be any ad that appears on a third-party website, such as the third-party website (e.g., related to area beaches) that is displayed in the user interface 200. For example, the third-party beach-related website can be a landing page associated with one of several search results 118 that are responsive to a search query 207 for "beaches."

The social overlay 204 can serve as an annotation that is associated with the ad 202. The annotation can include customized information related to the user and/or one or more groups that are associated with the user. For example, the social overlay 204 can annotate the ad 202 with information regarding the user's actions associated with the ad 202, or actions by members of one or more groups associated with the user (e.g., the user's circles of friends, family or other groups that are specified or inferred).

When the social overlay 204 is displayed, a social message 208 can provide any of several types of social information associated with the ad. In the example shown in FIG. 2, the social message 208 indicates that "394 people in Carmel +1'd this," meaning that 394 people in the Carmel area have "plussed one" the ad, or shared the ad with others, such as family or friends. This example provides a summary based on geographic proximity by identifying the number of users in a certain geographic region (e.g., Carmel) who shared the ad. Other example proximity-based summaries include time-based summaries, e.g., the number of users who shared (or liked, etc.) the ad within the last hour (or some other time interval). Regional (e.g., Carmel) and other proximity-based social messages 208 can summarize actions by people who are not members of the user's groups. Other example types of information that the social message 208 can provide include the number of members in the user's groups who liked the ad, the name of a user's friend who liked the ad, and so on.

In some implementations, the social message 208 can provide statistics related to people in the user's various social groups or circles, such as the members of the user's group who had a favorable response to the advertisement. For example, the social message 208 can identify the number of the user's family members who liked the ad, or the number of people in the user's circle of friends who re-published the ad, to name a few examples. Other example social messages 208 include messages such as "Jerry, your wife +1'd this ad," "David, Roger and 4 more friends shared this ad" or "Peggy and 3 other family members shared this ad."

In some implementations, more than one type of summary message may be applied to an ad, such as a geographically-based summary (e.g., Carmel area) and a user's circle-based summary message (e.g., friends or family). In some implementations, if more than one type of summary message is to be applied to an ad, the user interface 200 can cycle between the different summary messages in the social message 208. For example, the social message 208 that is displayed may alternate between summary messages such as "394 people in Carmel +1'd this," and "14 of your friends liked this ad." In some implementations, the user interface 200 can automatically cycle through summary messages by scrolling through the summary messages that apply to an ad, displaying each in the social message 208. For example, the user interface 200 can display one summary message for a few seconds, then the next summary message, and so on. In some implementations, the social message 208 can include all summary messages at once (e.g., if there are between one and three summary messages). In some implementations, the user interface 200 can include a control by which the user can access the summary messages that apply to an ad. In some implementations, the summary message that is displayed can change to a different applicable summary message if the user hovers over the social message 208 using a position indicator such as a cursor, a pointer, or the touch of a finger or stylus on a touch screen.

The control 206 can include various controls for re-publishing and/or commenting on the ads (e.g., the ad 202 upon which the social overlay 204 is displayed). In this example, the control 206 includes a plus one control 210 for re-publishing or commenting upon the ad 202, a help control 212, and an information control 214. The plus one control 210 can lead to an interface from which the user can provide detailed information, as will be described below with reference to FIG. 3. By selecting the help control 212, for example, the user can be presented with a popup or other control that provides an explanation of the social overlay 204 and how it is used. As an example, a user who is unfamiliar with re-publishing ads may click on the help control 212 to learn how the interface operates and what can result from the user's interaction with it (e.g., what his friends and family may see). By selecting the information control 214, for example, the user can navigate to a website or other information that provides information on ads.

The ad 202 can be one of several ads that appear in an advertisements section 216 on the third-party website. Other ads 202a and 202b can appear in a content section 220 of the third-party website. For example, the ad 202a can be another ad that includes a social overlay 204a. In this example, the social overlay 204a includes a control 206a and a social message 208a that can be similar to the control 206 and social message 208 described above.

Figure 3:
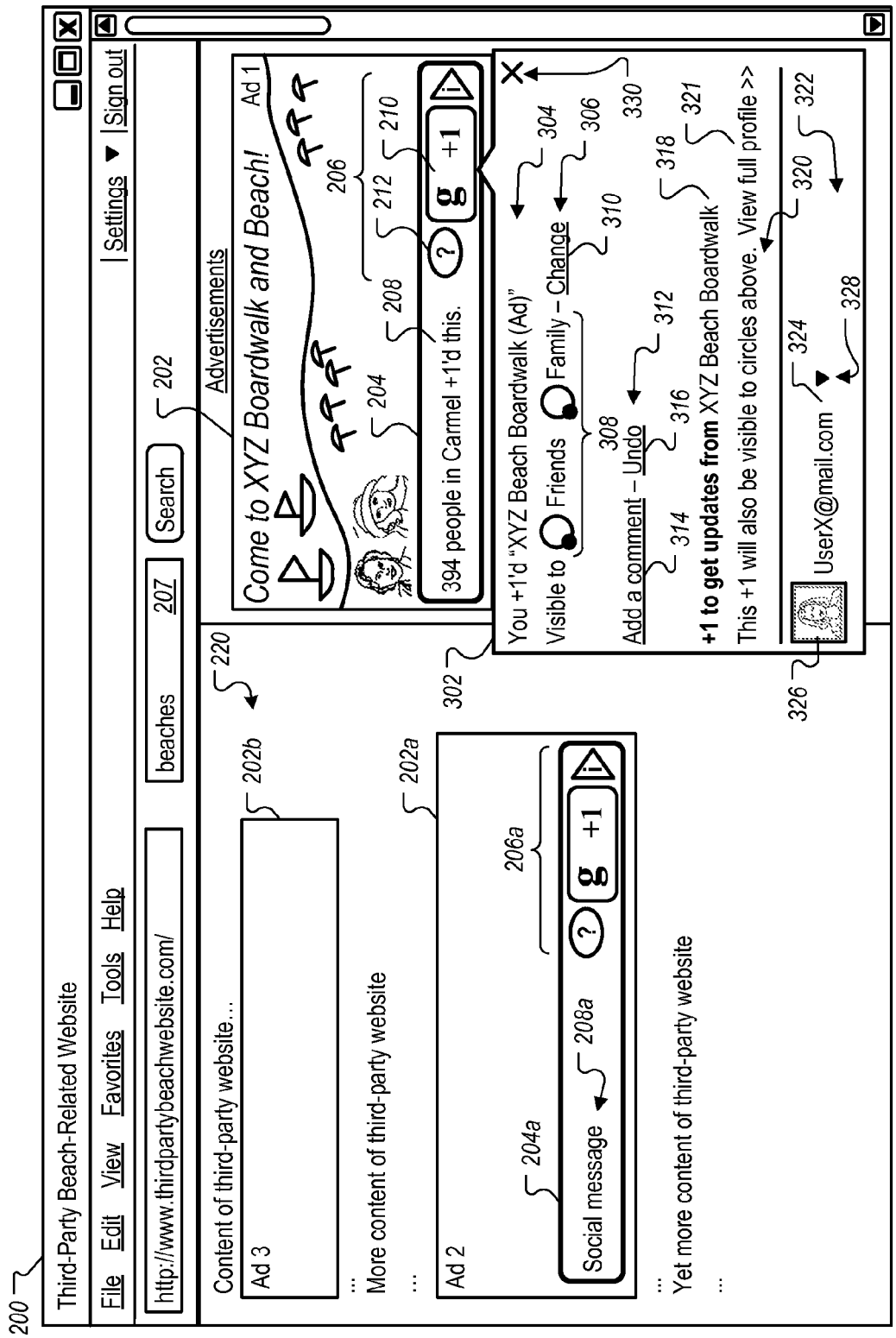
FIG. 3 shows an example details popup for providing detailed information for re-publishing an ad.

FIG. 3 shows an example details popup 302 for providing detailed information for re-publishing an ad. The details popup 302 can be displayed, for example, if the user selects the plus one control 210 shown in FIG. 2. The details popup 302 is just one example implementation of an interface that the user can use to provide detailed information for re-publishing an ad (e.g., re-publishing and/or commenting upon the ad 202). A header 304 can explain why the details popup 302 is displayed. In this example, the header 304 states that the user plussed-one (or shared) the "XYZ Beach Boardwalk" ad that is the subject of the ad 202, and in this case, the name of the advertiser. In some implementations, the name of the advertiser can be determined using application code that runs behind the plus one control 210 or the details popup 302, such as at the same time that the application retrieves existing social annotations and user information. In some implementations, if the user is the first person in a social group (e.g., friends, family, etc.) to see the ad 202, or if no one else has re-published or commented upon the ad 202, then a message can indicate to the user that he is the first to re-publish/comment.

Figure 4:
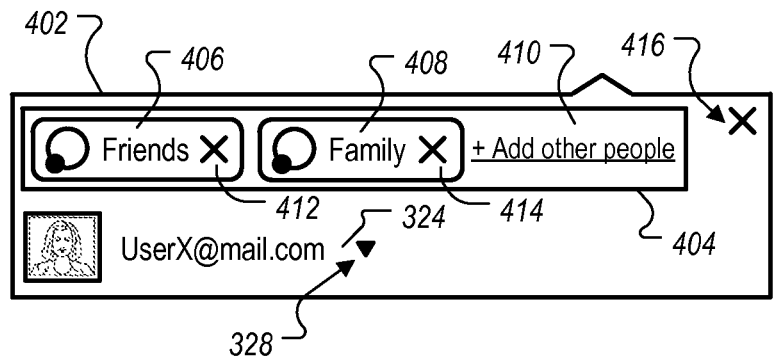
FIG. 4 shows an example visibility change popup for changing visibility settings for re-publishing an ad.
Figure 5:
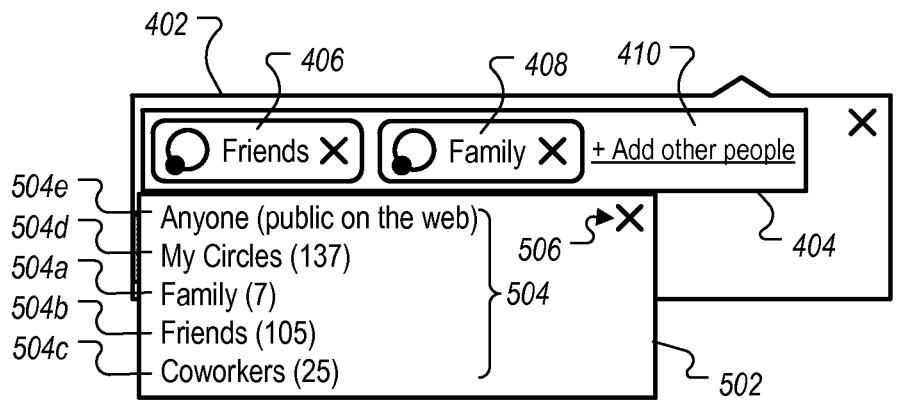
FIG. 5 shows an example groups selection list for displaying selectable visibility groups.

The details popup 302 includes a visibility area 306 that summarizes the groups with which the user's ad re-publishing/comments are to be applied. For example, current settings 308 indicate that the user's shared information is to be visible to (and thus shared with) the user's friends and family. The user can use a change control 310 to change the visibility of the shared information, effectively changing the current settings 308. FIGS. 4 and 5, described below, show example user interfaces that can appear if the user selects the change control 310.

The details popup 302 includes a commenting area 312 for adding a comment and/or removing a comment that has been associated with an ad. The commenting area 312 includes an add comment control 314 for adding a comment (e.g., described below with reference to FIG. 6) and an undo comment control 316 for undoing (or deleting) the added comment. In some implementations, the undo comment control 316 does not appear within the details popup 302 (or may be grayed out or otherwise inactive) until a comment has been added.

In some implementations, the user can designate that the advertisement is to be provided to a social application for presentation in an activity stream associated with the user. The advertisement and associated comments can be displayed, for example, as part of an update posted to the user's activity stream. In some implementations, the user can designate that the advertisement is to be provided to a social application for presentation as an update for the user in an activity stream associated with one or more members of a group specified by the user. For example, the advertisement and associated comments may be presented as an update to an activity stream of each member of each group specified in the current settings 308. As another example, some or all groups specified in the current settings 308 may have an associated activity stream in a social application and the advertisement and associated comments may be presented as an update to each of those activity streams.

The details popup 302 can include an update request control 318 that the user can use to request to receive periodic updates from the advertiser that is associated with the ad 202. For example, using the control 318, the user can subscribe to periodic email messages, text messages, or other forms of communication that the advertiser can send to interested parties. In this way, the user can "follow" an advertiser in a way that is similar to how users "follow" an individual or entity online (e.g., such as on Twitter).

A statement 320 that can be displayed within the details popup 302 can identify, to the user, the users (e.g., individuals, specified or inferred groups or social circles) who may be eligible to see the re-published ad. For example, the statement 320 can state, "This +1 will also be visible to circles above." As a result, the user can become acquainted with the mechanics and consequences of re-publishing ads that result from the selections and settings in the details popup 302, further allowing the user to understand the visibility of the ad-re-publishing. In some implementations, if the user has used the change control 310 to change the visibility to the extent that no other users currently have visibility, then the statement 320 can state, for example, "No users currently have visibility." By selecting a view full profile control 321, the user can navigate, for example, to the advertiser profile page on a social network site.

In some implementations, filtering or limiting of re-publication requests can occur. As a result, the mere designation by a user to re-publish to one or more groups or individuals does not necessarily mean that re-publishing will occur. For example, the designated receivers may have blocked receipt (e.g., by setting preferences in a browser to block all or selected types of social overlays on content and/or ads). In another example, some implementations of the ad management system 110 may filter re-publication requests based on one or more criteria. Example criteria include imposing limits on re-publishing, e.g., limiting the number of re-publishing events, the number of recipients, and so on. In some implementations, imposed limits on re-publishing can be applied to intervals of time, e.g., enforcing a limit of five re-published ads per day, twenty re-published ads per week, and so on. As a result, the ad management system 110 can prevent users from re-publishing too often or to too many people. Other criteria can be used for filtering re-publishing requests.

In some implementations, an email area 322 can identify the user account 324 (e.g., userX@mail.com) from which the ad-re-publishing will occur. For example, an email address can be tied to the user's social networking account, or the email address may not be tied to any social networking account. In some implementations, a user profile image 326 can provide a visual identification to the user as to what account 324 is currently displayed. If the user has multiple computer logins and/or accounts, then the user can use an email change control 328, for example, to select a different one of the user's accounts (e.g., userX@ABCDmail.com). In some implementations, ad-re-publishing need not rely upon the user having an email account. For example, the user can belong to one or more social networking systems, and ad-re-publishing that the user performs can be tied to a user name, a user account, or other form of user identification.

As a result of selecting which account (email or user login/account) to use, the user is also associating the ad-re-publishing with the groups or social circles that correspond to that user account. For example, the user's circles of family and friends may be vastly different for the social networking accounts associated with the user's email addresses userX@mail.com versus userX@ABCDmail.com (or one user login/account versus another user login/account).

A close control 330 can be used to exit the details popup 302 and save the current settings and inputs. In some implementations, a cancel control can exist that can allow the user to exit the details popup 302 without saving any changes, essentially restoring the values of the details popup 302 to their original settings (e.g., before the user displayed the popup 302).

In some implementation, the details popup 302 can include an option to un-plus the ad, or to cancel the act of re-publishing the ad with others. For example, if the user changes his mind about re-publishing the ad to family and friends, or decides not to share his comments, the user can select an un-plus option (not shown in FIG. 3), e.g., somewhere inside the details popup 302. In some implementations, selecting the un-plus option can make the social overlay 204 appear in a different way in order to indicate that the ad is no longer to be re-published. For example, while the ad is still displayed after the user has plussed-one the ad and the message reads "You and 394 people in Carmel +1'd this," upon the user un-plussing the ad, the message can return to its original state, namely "394 people in Carmel +1'd this."

FIG. 4 shows an example visibility change popup 402 for changing visibility settings for re-publishing an ad. In some implementations, the user interface 200 can display the visibility change popup 402 when, for example, the user selects the visibility change control 310 described with reference to FIG. 3. As an example, the user may select the visibility change control 310 to delete one or more of the visibility settings 308 (e.g., "Friends" or "Family") and/or to choose additional visibility options.

In some implementations, when the visibility change popup 402 is displayed, the current visibility settings 308 can be displayed as selectable controls, e.g., controls 406 and 408 (e.g., for "Friends" and "Family"). The controls 406 and 408 can identify the name of the group for which visibility is currently set for the user's re-published ad.

An add other people control 410 can provide a way for adding additional individuals or groups to the existing groups for which visibility exists regarding the user's re-published ad. For example, if the user selects the add other people control 410, another popup can appear from which the user can add visibility entities, as described below with reference to FIG. 5.

The controls 406 and 408 can further include delete controls 412 and 414, respectively, that the user can use to selectively delete either or both groups. For example, by selecting the delete control 412, the "Friends" group can be removed from visibility, and the group control 406 can disappear from the visibility change popup 402.

In some implementations, by clicking on the either of the controls 406 and 408, the user can view the names of the users in that group. For example, if the user selects the "Friends" control 412, then the user interface 200 can display a popup that lists the people in the user's circle of friends.

In some implementations, the visibility change popup 402 can display the user account 324 and the email change control 328 that the user can select to switch to a different user login. The user may switch to a different user login, for example, in order to re-publish the ad with a different circle of family and friends, e.g., the family and friends associated with his other user login (e.g., UserX@ABCDmail.com).

A close control 416 can be used to exit the visibility change popup 402 and save the current settings and inputs. In some implementations, a cancel control can exist that can allow the user to exit the visibility change popup 402 without saving any changes, essentially restoring the values of the visibility change popup 402 to their original settings (e.g., before the user displayed the popup).

FIG. 5 shows an example groups selection list 502 for displaying selectable visibility groups. For example, the user interface 200 can display the groups selection list 502 if the user selects the add other people control 410 on the visibility change popup 402 as described above.

The groups selection list 502 can include group entries 504, each of which can identify the name of the group and can further include, in parentheses, the number of people in that group. For example, the group entries 504 can include a Family group 504a with seven members, a Friends group 504b with 105 members, and a coworkers group 504c with 25 members. In some implementations, the group entries 504 can include entries that are supersets or unions of two or more other groups. For example, a My Circles group 504d can represent the union of the Family, Friends and Coworkers groups 504a-c. As a result, the total membership in the My Circles group 504d (e.g., 137) can be the sum of the group memberships that the superset group includes (e.g., 7+105+25). An Anyone group 504e can apply to the group by which the user can re-publish the ad with everyone online, and the parenthetical membership for the Anyone group 504e can be "public on the web." In some implementations, by selecting the parenthetical membership number, the user interface 200 can display the list of individual members in the group. For example, the user may want to see the names of the people in a group as a reminder of who the re-published ad would be shared with if that group is made visible.

In some implementations, each time the user selects a new group from the group entries 504, a selectable control for that group can appear in the visibility change popup 402, such as is shown for the Friends control 406 and the Family control 408. In some implementations, updating the controls in the visibility change popup 402 may not occur until after the user exits the groups selection list 502, such as by selecting an exit control 506.

Figure 6:
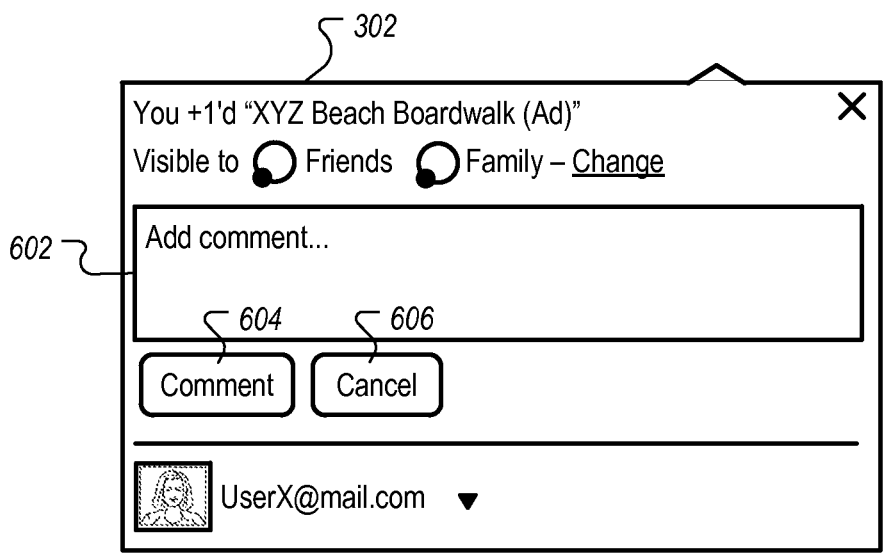
FIG. 6 shows an example add comment box for sharing a comment on an ad.

FIG. 6 shows an example add comment box 602 for sharing a comment on an ad. For example, the user can use the add comment box 602 to enter a comment associated with an ad (e.g., the ad 202). The user interface 200 can display the add comment box 602, for example, if user selects the add a comment control 314 in order to comment upon the ad 202 and share his comments with others. As an example, if the ad 202 advertises a particularly interesting-looking waterfront location (e.g., the oceanfront boardwalk in the ad 202), then the user may enter, "I bet the view of the ocean is beautiful!" or some other comment in the add comment box 602. In some implementations, as soon as the user begins typing in the add comment box 602, any prompt message (e.g., "add comment . . . ") can be immediately replaced by whatever the user types in.

By selecting a comment control 604, the user can save the comment that he has typed into the add comment box 602, and the saved comment can be displayed, for example, in the details popup 302. However, if the user decides not to keep the comment, the user can select a cancel control 606. Comments entered using the add comment box 602 can appear in an activity stream, such as the user's activity stream that lists recent activities performed by the user. In some implementations, the activity stream that is updated with the comment can be on a social website. In some implementations, comments that are posted to one or more activity streams can be in a standardized format so that any social website can interact with the comment and other components of an activity stream. In some implementations, the comment added using the add comment box 602 can appear in a social overlay 204, e.g., as all or part of a social message 208.

In some implementations, the control 206 described above can include or provide access to additional controls by which a user can view comments for an ad (e.g., the ad 202) that have been made by other users. In some implementations, the comments that a user views using the control 206 can be made anonymous. In some implementations, the social message 208 can indicate the number of users who have commented upon an ad (e.g., "25 people in Carmel commented on this ad").

Figure 7:
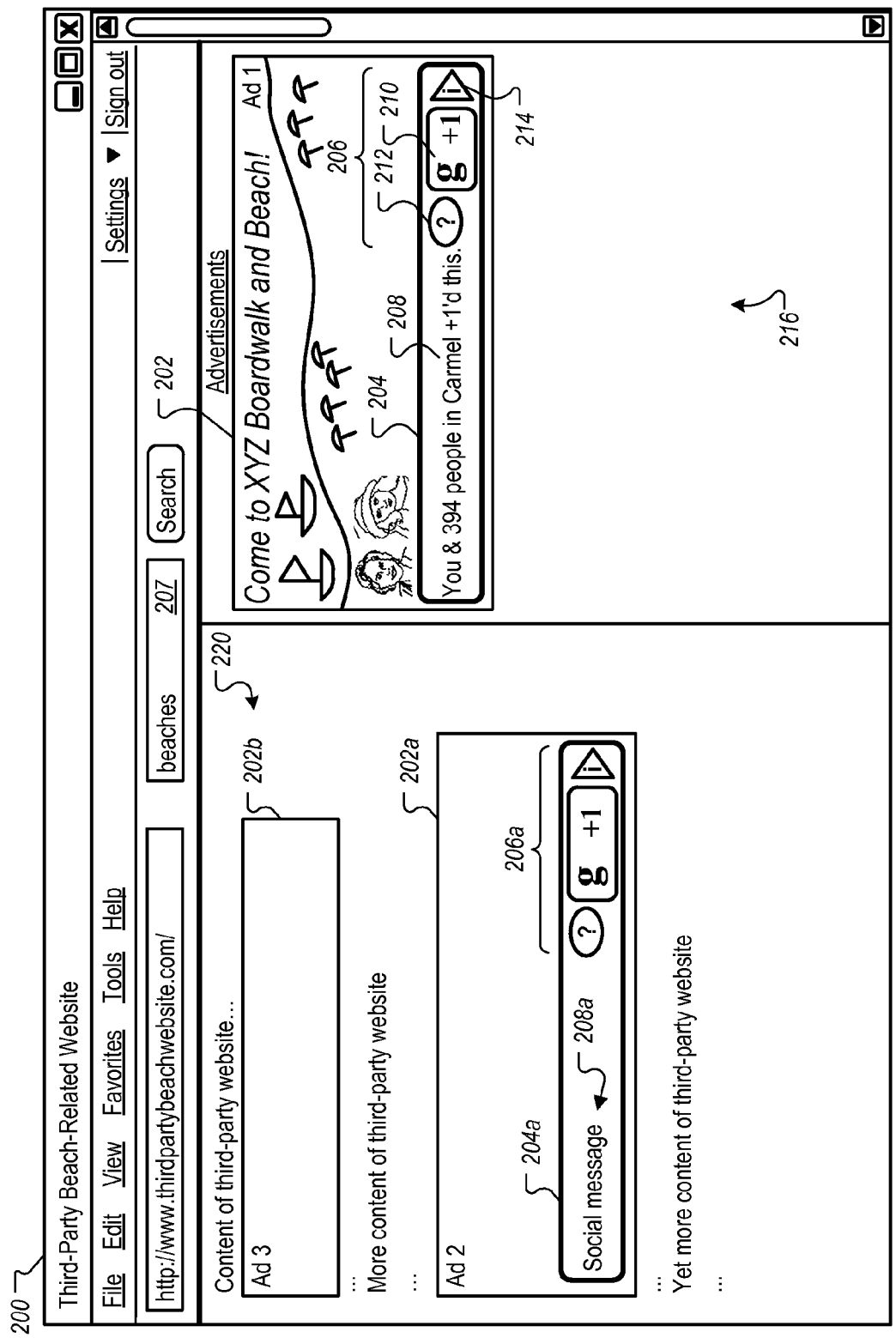
FIG. 7 shows the example user interface of FIG. 2 with the social overlay that is updated to indicate that the user has re-published the ad.

FIG. 7 shows the example user interface 200 of FIG. 2 with the social overlay 204 that is updated to indicate that the user has re-published the ad 202. In the current example, because the user has re-published the ad 202, the social message 208 is now prefaced with "You and . . . " and now reads "You and 394 people in Carmel +1'd this." In some implementations, if additional users (e.g., three more users) in the Carmel area have re-published the ad 202 since the user's act of re-publishing the ad, the social message 208 can update the information (e.g., "You and 397 people in Carmel +1'd this"). In some implementations, other information can be included in the social message 208 if additional activity has occurred (e.g., sharing, etc.) by one or more other users.

The updated social overlay 204 in FIG. 7 is an example completed loop of events and user actions, starting with the display of the ad 202 that is annotated with the original social overlay 204 and social message 208. Then, as a result of the user re-publishing the ad 202 (e.g., by choosing to "plus one" the ad), the ad 202 is re-published. As a result, the user's social overlay 204 includes a second, different annotation (e.g., an updated social message 208, "You and . . . ") along with the re-published ad. Other users can also experience an updated social message 208 that reflects the current user's activity. For example, the social message 208 that the other users see can include an updated count of users who re-published the ad, e.g., "395 people in Carmel +1'd this." The ad management system 110, for example, can produce one or more new social messages 208 for an ad 202 based on actions of one or users in re-publishing the ad 202 (e.g., sharing, commenting, etc.).

In some implementations, in addition to determining which social message 208 is to be included or annotated in the social overlay 204, a determination can be made (e.g., by the ad management system 110) whether to show the annotation at all. For example, since the annotation may occupy valuable space within the ad block of the ad 202, the ad management system 110 can decide to show the annotation only when it is believed that the annotation will actually be relevant, e.g., that the user re-publishes the ad. In some implementations, the placement, size and format of the social overlay 204 in the ad 202 can depend on the size and position of un-used space (e.g., blank space) in the ad. For example, the social overlay 204 can generally appear along the bottom of the ad 202 only if nothing relevant (e.g., text) in the ad 202 is covered by the annotation.

Figure 8:
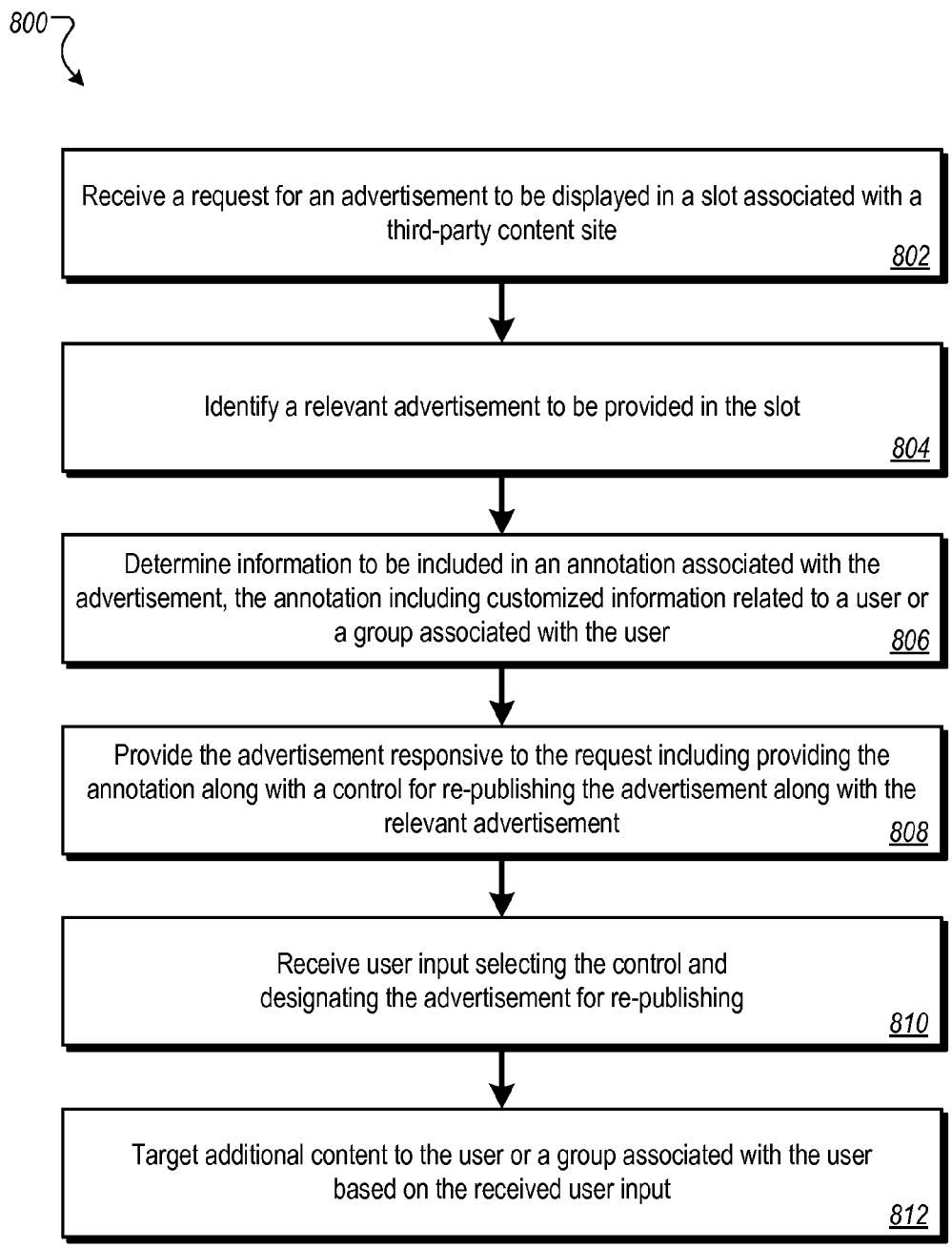
FIG. 8 is a flowchart of an example process for targeting content to a user or a group associated with the user based on a received input designating an advertisement for re-publishing.

FIG. 8 is a flowchart of an example process 800 for targeting content to a user or a group associated with the user based on a received input designating an advertisement for re-publishing. For example, the process 800 can be used to serve an ad 202 with a social overlay 204. The social overlay 204 can include tools by which the user can provide input for re-publishing the ad, and additional content can be targeted to the user or to a group associated with the user based on the re-publishing of the ad 202. The process 800 can be performed, for example, by the ad management system 110.

A request is received for an advertisement to be displayed in a slot (e.g., associated with a third-party content site) (802). For example, referring to FIG. 1, the ad management system 110 can receive a request to provide an ad in a slot in the third-party web page that corresponds to a resource 105. The request can occur, for example, when search results 118 are generated in response to a query 116. In some implementations, the ad management system 110 can have no control of the general content of the third-party website except for providing ads that fill slots on the web page.

A relevant advertisement is identified to be provided in the slot (804). As an example, the ad management system 110 can identify an ad 202 (see FIG. 2) that is relevant (e.g., to the third-party web site). For example, if the web site is related to beaches or waterfronts, then the ad management system 110 can identify an ad 202 that advertises a beach-related product or service. In some implementations, the identification process can use keywords (e.g., "beaches") that correspond to the user's query for content. In some implementations, the ad management system 110 can identify ads that are targeted to the user. For example, if the user is known to live in the Carmel area of California, or if the GPS location of the user's mobile computing device indicates that the user is currently in that area, then the ad management system 110 can identify an ad for a Carmel area beach. In some implementations, identification of the ad can be based on the extent or recentness of users in the user's social circles who have re-published the ad. For example, if several members of the user's groups have commented on an ad, or if significant recent re-publishing of the ad has occurred, the ad management system 110 can select that particular ad over other ads that may have less social context (e.g., and interest to the user).

Information to be included in an annotation associated with the advertisement is determined, and the annotation includes customized information related to the user or a group associated with the user (806). As an example, for the relevant advertisement that is identified, the ad management system 110 can identify information that is customized for the user on whose computing device the ad will be displayed. Examples of customization include the number of the user's family or friends who re-published the ad, or the number of users in the user's geographic area who re-published the ad.

In some implementations, the customization can use any suitable piece of information that is associated with the user when determining information to be included in the annotation. Example information includes demographics such as gender, age, income, occupation, hobbies, and so on. These demographic categories can be used to create annotations that are meaningful to the user because the user is also within those demographics.

The advertisement responsive to the request is provided, including the annotation along with a control for re-publishing the advertisement along with the relevant advertisement (808). As an example, referring to FIG. 2, the ad management system 110 can provide the ad 202 that is annotated with the social overlay 204. The social message 208 that is included in the social overlay 204 includes customized information that is related to the user or a group associated with the user. For example, the social overlay 204 can include information regarding the user's re-publishing of the ad and/or information regarding the actions of members of the user's social groups.

The annotation can include a control for re-publishing the advertisement. For example, the social overlay 204 includes the plus one control 208 for re-publishing the ad 202. The plus one control 208 enables the user to re-publish the ad 202 to one or more members of each of one or more of the user's groups. The user's groups can include, for example, a social circle, family, friends, work group, any other particularly identified group, or one or more inferred groups. The plus one control 208 can also enable the user to re-publish the ad 202 to other individuals that are not members of any group associated with the user.

User input selecting the control and designating the advertisement for re-publishing is received (810). For example, referring to FIG. 2, the user can select the plus one control 210 to designate the ad 202 for re-publishing. Along with a designation to re-publish the advertisement, a user input specifying recipients for receiving the re-published advertisement can be received. For example, referring to FIG. 3, recipients for receiving the re-published ad 202 can be specified using the current settings 308. In some implementations, the received user input includes a designation to provide the advertisement and associated comments to a social application for presentation in an activity stream associated with the user. As another example, in some implementations, the received user input includes a designation to provide the advertisement as an update for the user in an activity stream associated with one or more members of a group specified by the user.

Additional content is targeted to the user or a group associated with the user based on the received user input (812). For example, the received user input can be used as a signal when determining relevant content to be provided to the user in the future. For example, one or more ads can be targeted to the user in response to a future request for ads. Ads may be requested for one or more ad slots, such as ad slots included on a third party web page or on a search results page viewed by the user.

In response to a request for ads, one or more ads may be selected. For example, referring to FIG. 1, one or more ads may be selected by the ad management system 110. The ad management system 110 may select ads based on a quality score, where the quality score for an ad indicates, for example, the relevance of the ad to a received request for an ad. The quality score may be affected by one or more signals, such as one or more social signals, that are based on the received user input.

In some implementations, a social signal for a user may be based at least in part on tracked data associated with designations of ads for re-publishing by the user. For example, the ad management system 110 can track, for each ad designated for re-publishing by the user, an identifier of the ad, targeting keywords associated with the ad, a date and time of designation, any recipients designated to receive the re-published ad, context associated with the re-publication and the location of the user at the time of designation (e.g., as determined by a location detection device (e.g., GPS (Global Positioning Satellite) receiver)). Other information can be tracked, such as the URL of the page that hosted the original ad designated for re-publishing or its associated landing page, and whether the hosting web page is a search results web page. If the hosting web page is a search results web page, search keywords used for the search associated with the search results web page can be tracked. Browsing history information which indicates how a user navigated to the hosting web page can be tracked, and content keywords of the including web page can be tracked. As described in more detail below, targeting can be based on some or all of the tracked data.

Additional information can be derived from tracked data, and targeting can be based on the derived information. For example, one or more rates of re-publishing can be determined for a user, such as how often a user re-publishes ads in a given time period, or how often a user re-publishes ads having certain targeting keywords in a given time period. For example, it can be determined that a user re-publishes five ads for sports cars, on average, per month. As another example, one or more rates of re-publishing to other users or groups can be determined. For example, for each user or group a user re-publishes ads to, a rate of re-publishing can be determined. For example, it can be determined that a user re-publishes, on average three ads per week to a particular, other user, or that the user re-publishes, on average, six ads per month to a particular group. If a user frequently (e.g., at more than a threshold rate) re-publishes ads to a same set of individual users, a social group including those users can be inferred, even if those users are not otherwise included in a specified group.

Targeting of additional content to the user may be based on the tracked data and/or on information derived from the tracked data. For example, if a user has designated for re-publishing ads having certain targeting keywords, other ads having the same or similar targeting keywords can be targeted to the user in the future. As a more particular example, if the user has designated for republishing ads having a certain targeting keyword more than a threshold number of times within a certain time period, then other ads having that targeting keyword can be selected for presentation to the user. For instance, if the user has designated for re-publishing more than five ads for sporting equipment within the past month, other ads for sporting equipment may be presented to the user in the future.

Targeting of additional content to a user may be based on previous social activity of the user. For example, targeting of additional content may be based on who has been designated as recipients of re-published ads. In some implementations, if a first user has re-published ads related to a particular topic or having particular targeting keywords to a second user, additional ads having relating to that topic or having those targeting keywords may be targeted in the future to both the first user and the second user. For example, it may be assumed that it is likely that both the first user and the second user have an interest in content related to the targeting keywords. As a particular example, if the first user designates an ad related to sporting equipment for re-publishing to the second user, other ads related to sporting equipment can be targeted to both the first user and the second user in the future.

It may also be assumed that it is likely that the first user and the second user share at least some other, common interests, and that that the first user may be generally interested in content that the second user is interested in. Therefore, ads that have been previously designated for re-publishing by the second user may be selected for re-publishing to the first user, even if the second user did not explicitly designate the first user when designating the ads for re-publishing. As another example, other ads that the first user designated for re-publishing but that were not designated at that time to be received by the second user, can in the future be targeted to the second user, based on the assumption that the first user and the second user share some common interests.

If an ad is targeted to the second user based on a previous designation for re-publishing of the ad by the first user, the ad may, when presented to the second user, include a custom annotation which indicates that the first user had previously designated the ad for re-publication. For example, an annotation of an ad presented to "Tom" may indicate that "Bob likes this". As another example, an ad targeted to a given user may include a custom annotation which indicates how many users that are members of a group associated with the user have previously designated the ad for re-publishing. For example, an ad presented to "Tom" may include a custom annotation of "Five of your friends like this".

Targeting of additional content may be based on other context associated with the designation of an ad for re-publishing. For example, a user may tend to designate ads or ads having a particular topic or particular targeting keywords for re-publishing at certain times of day or times of year. For example, a trend of a user designating vacation ads for re-publishing during the month of June can be determined and other vacation ads can be targeted to the user during the month of June in future years. As another example, a user may tend to designate theater ads for re-publishing on Friday afternoons, and other theater or other entertainment-related ads can be targeted to the user on Friday afternoons in future weeks.

Targeting of content may be based on a user's location. For example, if a user tends to designate ads for re-publishing while at a particular location (e.g., in a particular city, at a particular address), then ads associated with that location can be targeted to the user. In some implementations, ads associated with a location can be generally targeted to the user regardless of the user's current location, and in other implementations ads associated with the location can be targeted to the user when the user is at the location. In some implementations, if the user is at a particular location, such as a location not previously associated with the user, then ads associated with that location that have been previously designated for re-publishing by other users (e.g., users not otherwise associated with the user) can be targeted to the user, while the user is at the location. For example, if a user who lives in Chicago travels to New York, ads associated with New York that have been previously designated by other users for re-publishing can be presented to the user while the user is in New York.

In addition to tracking the designation of an ad for re-republishing, user interactions with a re-published ad that is presented (e.g., in an activity stream) can be tracked, and additional content can be targeted to the user or to a group associated with the user based on the interactions. An ad may be re-published to an activity stream, for example, based on a designation by a user. For example, an ad may be re-published to an activity stream associated with the user or an activity stream associated with one or more members of a group specified by the user.

The user or a member of a group specified by the user can interact with the ad, such as to designate either liking or disliking the ad. As another example, the user or a member of a group specified by the user can select the ad, such as to expand the ad or to navigate to a landing page associated with the ad. As yet another example, the user can enter a comment associated with the ad. Interacting with an ad in an activity stream can indicate interest in content related to a topic associated with the ad or targeting keywords associated with the ad. Therefore, additional ads or other content related to targeting keywords of the ad can be presented to the user in the future, based on tracked interactions.

If multiple users interact with a republished ad (e.g., one posted to an activity stream), then additional content related to the ad can be targeted to each of the users. If a first user frequently (e.g., at more than a threshold rate) interacts with ads posted to an activity stream by a second user, then it can be inferred that a relationship exists between the first user and the second user and that they may share common interests. Consequently, ads targeted to either the first user or the second user may also be targeted to the other user.

In some implementations, the age of tracked data can affect whether content is targeted to a user. For example, one or more ads having particular targeting keywords may be selected to be presented to the user if the user has re-published other ads having those or similar targeting keywords within a predetermined time period (e.g., the past month). In this example, if the last time the user re-published ads having the particular targeting keywords was three months ago, ads having those targeting keywords might not be selected for presentation to the user. As another example, more recent tracked data may be given higher weight than older tracked data when determining a relevancy of tracked data. For example, tracked data for ads republished within the past month may be given a weight of 100%, tracked data for ads re-published between one month and three months from the current date may be given a weight of 60%, and tracked data for ads re-published more than three months from the current date may be given a weight of 0%.

In addition to targeting additional content to a user, additional content can be targeted to one or more groups associated with the user. For example, if the user designates a group as a recipient for a re-published ad, then it can be assumed that members of the group share common interests with the user, and other ads relating to a same topic or having the same or similar targeting keywords can be targeted to the group or to each member of the group in the future. As mentioned above, if a user frequently (e.g., at more than a threshold rate) re-publishes ads to a same set of individual users, a social group including those users can be inferred, even if those users are not otherwise included in a specified group. Additional ads similar to the ads re-published to the set of users can be presented in the future to each of the users in the inferred social group.

Other targeting activities can occur in response to the received user input other than selecting ads for presentation to the user. For example, and as mentioned, an annotation included in the ad to be re-published can be customized, such as to include a comment entered by the user or to indicate who or how many people have designated the ad for re-publishing. As another example, the user may be surfaced to one or more advertisers.

Figure 9:
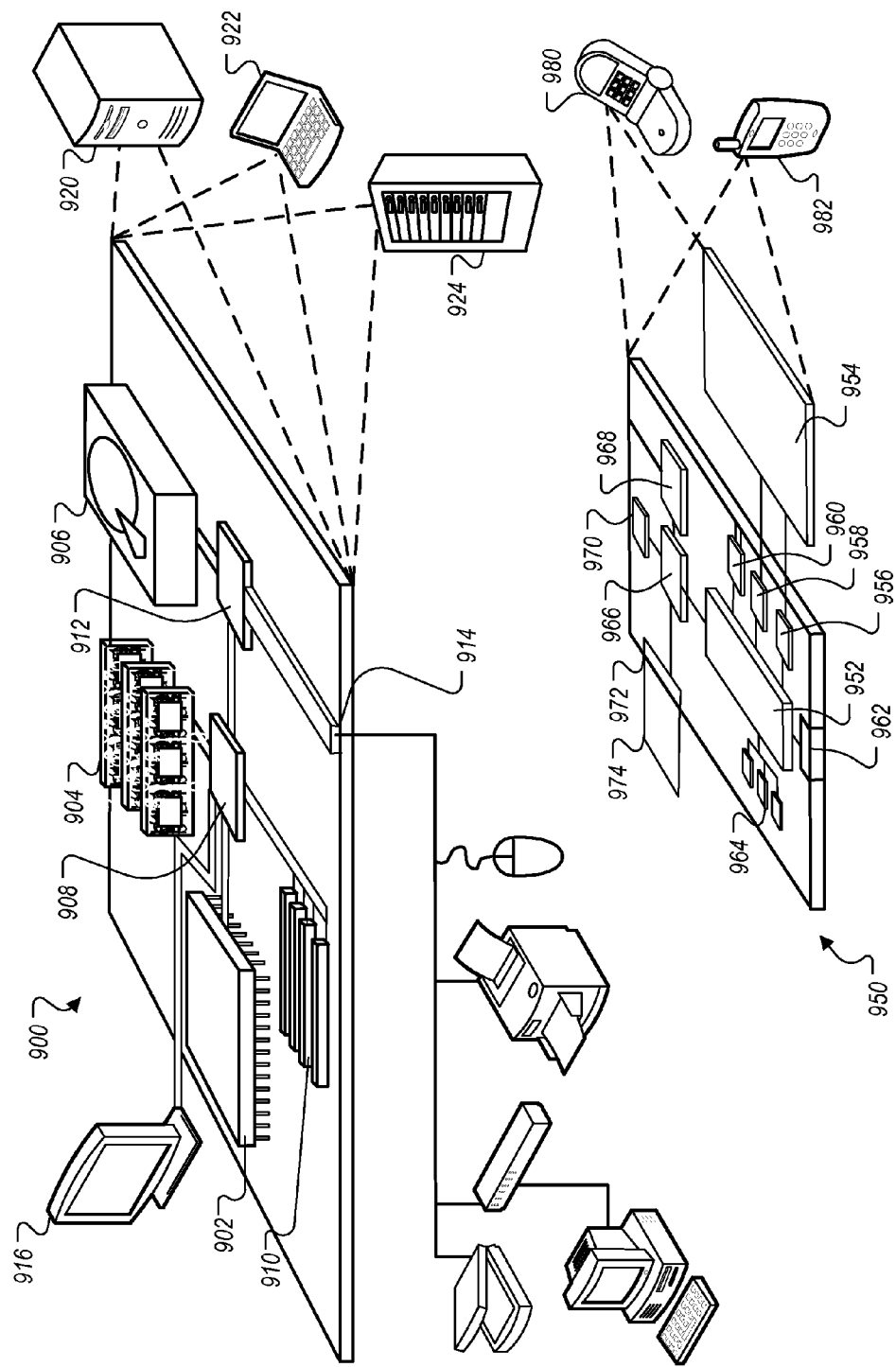
FIG. 9 is a block diagram of computing devices that may be used to implement the systems and methods described in this document, as either a client or as a server or plurality of servers.

FIG. 9 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a computer-readable medium. In one implementation, the memory 904 is a volatile memory unit or units. In another implementation, the memory 904 is a non-volatile memory unit or units.

The storage device 906 is capable of providing mass storage for the computing device 900. In one implementation, the storage device 906 is a computer-readable medium. In various different implementations, the storage device 906 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of duties is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can process instructions for execution within the computing device 950, including instructions stored in the memory 964. The processor may also include separate analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD display or an OLED display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication (e.g., via a docking procedure) or for wireless communication (e.g., via Bluetooth or other such technologies).

The memory 964 stores information within the computing device 950. In one implementation, the memory 964 is a computer-readable medium. In one implementation, the memory 964 is a volatile memory unit or units. In another implementation, the memory 964 is a non-volatile memory unit or units. Expansion memory 974 may also be provided and connected to device 950 through expansion interface 972, which may include, for example, a SIMM card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS receiver module 970 may provide additional wireless data to device 950, which may be used as appropriate by applications running on device 950.

Device 950 may also communication audibly using audio codec 960, which may receive spoken information from a user and convert it to usable digital information. Audio codex 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method for providing content comprising:

receiving, by a processor, a request for an advertisement to be displayed in a slot associated with a third-party content site;

identifying, by the processor, a relevant advertisement to be provided in the slot;

in response to the request, transmitting, by the processor to a user device, machine readable instructions that present a graphic visualization of a control interface that is initially presented within the relevant advertisement, in a display of the user device, the control interface configured to enable the user device to receive, through the control interface, user input specifying:
  an annotation associated with the relevant advertisement, the annotation being user defined free form text input through the control interface associated with the relevant advertisement; and
  a selection, by the user at the user device, of one or more other users that are different from the user and are to receive the annotation, wherein the control interface enables the user device to transmit a modified version of the relevant advertisement that includes the free form text to one or more devices of the one or more other users;
detecting, by the processor, user interaction with the control interface that was initially presented within the relevant advertisement at the user device; and
distributing, in response to the user interaction with the control interface, data that causes the modified version of the relevant advertisement and additional advertisements different from the modified version of the relevant advertisement to be presented to the one or more devices of the selected one or more other users based on the received user input, the free form text, and the relevant advertisement, wherein the data is distributed through an electronic connection between the user devices of each of the one or more other users and a remote server associated with the processor, wherein the modified version of the relevant advertisement includes content overlay information that causes each device of the selected one or more other users to present a graphic visualization of a content overlay within the advertisement, the content overlay including a social message control configured to display, in the social message control, annotations associated with the relevant advertisement and including a re-publish control configured to allow a given user to re-publish the relevant advertisement, wherein the content overlay is initially presented at a placement position within and along the bottom of the modified version of the relevant advertisement when the placement position for the content overlay does not include text, such that the content overlay does not cover text of the relevant advertisement, wherein the social message control displays the free form text input by the user.

2. The method of claim 1 further comprising tracking inputs received from the user for advertisements that are designated for re-publishing and targeting the user based on the tracked inputs, wherein the targeting comprises distributing the additional advertisements.

3. The method of claim 1 further comprising tracking designations for whom the user re-publishes advertisements to and targeting additional content to the user or a group associated with the user based on the tracking.

4. The method of claim 1 further comprising tracking designations for how often the user re-publishes advertisements and targeting additional content to the user or a group associated with the user based on the tracking.

5. The method of claim 1, wherein the user input includes a designation to provide the relevant advertisement to a social application for presentation in an activity stream associated with the user, the method further comprising tracking user interactions with the relevant advertisement when presented in the activity stream and targeting additional content to the user or a group associated with the user based on the tracking.

6. The method of claim 1 further comprising tracking where the user is located or a time of designation for designations to re-publish the relevant advertisement and targeting additional content to the user or a group associated with the user based on the tracking.

7. The method of claim 1 further comprising tracking a context associated with the user when making a designation to re-publish the relevant advertisement and targeting additional content to the user or a group associated with the user based on the tracking.

8. The method of claim 1, wherein the user input includes a designation to provide the relevant advertisement to a social application for presentation as an update for the user in an activity stream associated with one or more members of a group specified by the user, the method further comprising tracking interactions with the relevant advertisement when presented in the activity stream and targeting additional content to the user or others based on the tracking.

9. The method of claim 1 further comprising tracking whom the user designates advertisements to be re-published to so as to infer relationships between the user and one or more other users to whom the user has designated advertisements to be re-published, and targeting additional content to the user or a group associated with the user based on the tracking.

10. The method of claim 1, wherein the control interface enables the user to re-publish the relevant advertisement to one or more members of a group associated with the user.

11. The method of claim 10, wherein the group associated with the user is selected from the groups comprising a social circle, family, friends, work groups, or other particularly identified groups.

12. The method of claim 1, wherein the control interface enables the user to re-publish the relevant advertisement to others that are not members of a group associated with the user.

13. The method of claim 1, wherein the control interface enables the user to re-publish the relevant advertisement along with a message.

14. The method of claim 1, wherein distributing data includes using the user input as a signal when determining relevant content to be provided to the user in the future.

15. The method of claim 1 further comprising determining one or more social signals for use in affecting a quality score that is used to evaluate content to be provided to the user where the one or more social signals are based at least in part on the user input.

16. The method of claim 15 further comprising determining one or more social signals based at least in part on the user input and using the social signals when determining content for presentation to the user.

17. The method of claim 16 where the one or more social signals are used to categorize the user as belonging to a group.

18. The method of claim 16 where the one or more social signals are used to customize annotations to be included with the advertisement that is re-published by the user.

19. The method of claim 16 where the one or more social signals are used to determine whether a system that re-publishes advertisements should re-publish other advertisements to the user.

20. The method of claim 16 where the one or more social signals are used to surface the user to an advertiser.

21. The method of claim 9, further comprising targeting additional content to a recipient of a re-published advertisement based on the tracking.

22. The method of claim 1, further comprising:

in response to user selection of a re-publishing control included in the control interface that is initially presented within the relevant advertisement, expanding the control interface outside of the relevant advertisement, wherein an expanded portion of the control interface includes at least one control for receiving user input specifying the annotation associated with the relevant advertisement, and at least one control for receiving user input specifying the selection of one or more other users that are different from the user and are to receive the annotation.

23. The method of claim 1, wherein the social message control automatically cycles through a series of messages related to the relevant advertisement, the series of messages including the free form text input by the user, and including free form text input by one or more other users.

24. A computer program product tangibly embodied in a non-transitory computer-readable storage device and comprising instructions that, when executed by a processor, cause the processor to:

receive a request for an advertisement to be displayed in a slot associated with a third-party content site;

identify a relevant advertisement to be provided in the slot;

in response to the request, transmit, to the user device, machine readable instructions that present a graphic visualization of a control interface that is initially presented within the relevant advertisement, in a display of the user device, the control interface configured to enable the user device to receive, through the control interface, user input specifying:

an annotation associated with the relevant advertisement, the annotation being user defined free form text input through the control interface associated with the relevant advertisement; and a selection, by the user at the user device, of one or more other users that are different from the user and are to receive the annotation, wherein the control interface enables the user device to transmit a modified version of the relevant advertisement that includes the free form text to one or more devices of the one or more other users;

detect user interaction with the control interface that was initially presented within the relevant advertisement at the user device; and distribute, in response to the user interaction with the control interface, data that causes the modified version of the relevant advertisement and additional advertisements different from the modified version of the relevant advertisement to be presented to the one or more devices of the selected one or more other users based on the received user input, the free form text, and the relevant advertisement, wherein the data is distributed through an electronic connection between the user devices of each of the one or more other users and a remote server associated with the processor, wherein the modified version of the relevant advertisement includes content overlay information that causes each device of the selected one or more other users to present a graphic visualization of a content overlay within the advertisement, the content overlay including a social message control configured to display, in the social message control, annotations associated with the relevant advertisement and including a re-publish control configured to allow a given user to re-publish the relevant advertisement, wherein the content overlay is initially presented at a placement position within and along the bottom of the modified version of the relevant advertisement when the placement position for the content overlay does not include text, such that the content overlay does not cover text of the relevant advertisement, wherein the social message control displays the free form text input by the user.

25. A system comprising:

a user device of a user;

a third party content site; and a content management system;

where a processor of the content management system is configured to:

receive a request for an advertisement to be displayed in a slot associated with the third-party content site;

identify a relevant advertisement to be provided in the slot;

in response to the request, transmit, to the user device, machine readable instructions that present a graphic visualization of a control interface that is initially presented within the relevant advertisement, in a display of the user device, the control interface configured to enable the user device to accept through the control interface, user input specifying:

an annotation associated with the relevant advertisement, the annotation being user defined free form text input through the control interface associated with the relevant advertisement; and a selection, by the user at the user device, of one or more other users that are different from the user and are to receive the annotation, wherein the control interface enables the user device to transmit a modified version of the relevant advertisement that includes the free form text to one or more devices of the one or more other users;

detect user interaction with the control interface that was initially presented within the relevant advertisement at the user device; and distribute, in response to the user interaction with the control interface, data that causes the modified version of the relevant advertisement and additional advertisements different from the modified version of the relevant advertisement to be presented to the one or more devices of the selected one or more other users based on the received user input, the free form text, and the relevant advertisement, wherein the data is distributed through an electronic connection between the user devices of each of the one or more other users and a remote server associated with the processor, wherein the modified version of the relevant advertisement includes content overlay information that causes each device of the selected one or more other users to present a graphic visualization of a content overlay within the advertisement, the content overlay including a social message control configured to display, in the social message control, annotations associated with the relevant advertisement and including a re-publish control configured to allow a given user to re-publish the relevant advertisement wherein the content overlay is initially presented at a placement position within and along the bottom of the modified version of the relevant advertisement when the placement position for the content overlay does not include text, such that the content overlay does not cover text of the relevant advertisement, wherein the social message control displays the free form text input by the user.

\* \* \* \* \*